United States Patent
Penkov et al.

(10) Patent No.: US 9,755,554 B2
(45) Date of Patent: Sep. 5, 2017

(54) APPARATUS AND MEANS FOR PROGRESSIVE MOTOR START BASED ON CURRENT DERIVATIVE SYNCHRONISATION

(71) Applicant: Schneider Electric Industries SAS, Rueil Malmaison (FR)

(72) Inventors: Delcho Penkov, Sant Martin d'Heres (FR); Alain Dentella, Beaucroissant (FR); Yann Herriot, Voiron (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 133 days.

(21) Appl. No.: 14/693,095

(22) Filed: Apr. 22, 2015

(65) Prior Publication Data
US 2015/0311829 A1    Oct. 29, 2015

(30) Foreign Application Priority Data
Apr. 23, 2014    (FR) ..................... 14 53644

(51) Int. Cl.
| | |
|---|---|
| H02P 1/16 | (2006.01) |
| H02P 1/04 | (2006.01) |
| H02P 1/42 | (2006.01) |
| H02P 27/024 | (2016.01) |

(52) U.S. Cl.
CPC .............. *H02P 1/423* (2013.01); *H02P 1/04* (2013.01); *H02P 27/024* (2016.02)

(58) Field of Classification Search
CPC ....... F02N 11/087; H05B 41/04; H02P 1/423; H02P 1/04
USPC .......................................................... 318/778
See application file for complete search history.

(56) References Cited

U.S. PATENT DOCUMENTS

| | | | |
|---|---|---|---|
| 5,008,608 A | 4/1991 | Unsworth et al. | |
| 5,859,514 A * | 1/1999 | Chouffier ................. | H02P 1/28 318/430 |
| 7,196,491 B2 * | 3/2007 | Mayhew ............... | H02P 27/024 318/430 |
| 2011/0291581 A1* | 12/2011 | Khalsa ................. | H05B 41/295 315/246 |
| 2013/0285592 A1 | 10/2013 | Johnson et al. | |

(Continued)

FOREIGN PATENT DOCUMENTS

| | | |
|---|---|---|
| FR | 2 980 058 A1 | 3/2013 |
| WO | WO 01/89073 A2 | 11/2001 |
| WO | WO 2013/038094 A2 | 3/2013 |

OTHER PUBLICATIONS

U.S. Appl. No. 14/693,165, filed Apr. 22, 2015, Durand, et al.
(Continued)

*Primary Examiner* — Bentsu Ro
*Assistant Examiner* — Zemenay Truneh
(74) *Attorney, Agent, or Firm* — Oblon, McClelland, Maier & Neustadt, L.L.P.

(57) ABSTRACT

A method for controlling a switch that controls a power supply line of an electric motor from an alternating voltage source, including determination of a switch closing instant ($t_f$) starting from a measurement of the derivative of the current carried on the power supply line. A starter system and a computer program product are capable of using this method.

13 Claims, 4 Drawing Sheets

(56) References Cited

U.S. PATENT DOCUMENTS

2014/0176152 A1* 6/2014 Wolbank ............ G01R 31/343
                                                          324/510
2014/0225554 A1   8/2014 Penkov et al.

OTHER PUBLICATIONS

U.S. Appl. No. 14/676,072, filed Apr. 1, 2015, Charles Blondel et al.
French Preliminary Search Report issued Mar. 11, 2015 in French Application 14 53644, filed on Apr. 23, 2014 ( with English Translation of Categories of Cited Documents).
R.P.P.S Meets et al. "Evaluation of high-voltage circuit breaker performance with a validated arc model", IEEE Proceedings: Generation, Transmission and Distribution, Institution of Electrical Engineers, vol. 147, No. 2, 2000, 5 pages.

* cited by examiner

APPARATUS AND MEANS FOR PROGRESSIVE MOTOR START BASED ON CURRENT DERIVATIVE SYNCHRONISATION

TECHNICAL FIELD

The field of the invention is that of electric motors, and more particularly control of starting electric motors by means of a progressive starter system inserted between the motor and the electrical power supply source.

STATE OF PRIOR ART

When an electric motor is started, the motor makes a current demand on the electrical network that supplies power to it. The result is a voltage drop in the network that can cause dysfunctions of some sensitive loads and possibly load shedding on the network.

To avoid this problem, it is known for example by patent application WO 01/89073 A2, that it is possible to connect the motor to the network indirectly through a progressive starter system known as a soft starter that uses controlled switches to progressively increase the root mean square value of the voltage applied to the motor.

In such systems, the controlled switches are made by semiconducting components and particularly thyristors. Consequently, the controlled switches are fragile and sensitive to transient voltages and currents applied to them during switching.

A single progressive starter system is frequently used to start several motors sequentially. It can then be easily understood that a failure in the starter system can cause substantial production losses in some applications.

It thus appears important to increase the operating reliability of these starter systems, and particularly to increase the operating reliability of motor starter systems for which nominal voltages are more than 500 V or even more than 1000 V or even equal to or more than 5.5 kV, due to values of transient voltages and currents applied to the controlled switches in these cases.

In particular, an oscillating transient current can be observed passing through a thyristor during closing switching. As transient current, that can be approximated as a damped high frequency sine curve, is proportional to the voltage at the thyristor terminals immediately before switching, patent application WO 2013/038094 A2 of the Applicant recommends that the closing of a thyristor should be controlled at an instant chosen from among time periods during which the transient voltage developed at the thyristor terminals following the current cutoff is minimal. This closing is thus controlled according to a so-called gamma control mode, in which closing is controlled at a certain gamma angle after the current passing through the thyristor changes through zero, in opposition to a so-called alpha control mode in which closing is controlled at a certain alpha angle after the alternating voltage of the source passes through zero.

Voltage measurements at the terminals of the thyristor require fairly sophisticated signal processing, particularly a high frequency sampling in order to detect minimum voltage values. Furthermore, such measurements make the design of the cabinet of the progressive starter system more complex and therefore increase its cost. Space must be found for the voltage sensor, which also creates insulation constraints. Furthermore, making voltage measurements at the terminals of a thyristor is not very practical, particularly in applications with nominal voltages of the order of several kilovolts in which several thyristors are connected in series.

In existing applications performing a gamma control, conventional current transformers of the magnetic core type are used to detect when the current passes through zero. These transformers induce a phase deviation that depends on the frequency of the current. A precise compensation of this deviation is difficult to make and in reality detection of instants at which the passage through zero occurs is fairly imprecise (precision of the order of 100 µs). Moreover, these sensors usually induce an offset that also makes the measurement very imprecise.

PRESENTATION OF THE INVENTION

The main purpose of the invention is to improve the precision of an electric motor starter control, particularly according to the above-mentioned patent application filed by the Applicant. The invention can advantageously be used when it is required to know the precise moment of blocking of a semiconductor.

In this respect, the invention discloses a method for controlling a switch that controls a power supply line of an electric motor from an alternating voltage source, including determination of a switch closing instant starting from a measurement of the derivative of the current carried on the power supply line.

Some preferred but not limitative aspects of the method are:
- determination of the closing instant includes detection of times at which the derivative of the current passes through zero and calculation of the frequency of a transient voltage appearing at the terminals of the switch following a passage of the current circulating on the power supply line through zero, starting from said instant at which it passes through zero;
- the frequency of the transient voltage corresponds to the frequency of a rectangular signal with fronts that coincide with the instants at which the derivative of the current passes through zero;
- determination of the closing instant consists of determining a switch opening duration;
- the closing instant is determined by determining a first time range starting from the frequency of passages of the derivative of the current through zero, the closing instant being included in the first time range, the first time range being defined as including all instants t satisfying the formula: $T \cdot (k-x) < t - t_{I0} < T \cdot (k+y)$, where $t_{I0}$ is the switch opening instant, T is the period corresponding to the frequency at which the derivative of the current passes through zero, k is a natural integer between 1 and a natural integer n, and x and y are numbers strictly between 0 and 1;
- determination of the closing instant includes determination of a second time range starting from a trigger time value subsequent to a passage of the alternating source voltage through zero, the closing instant occurring at the instant common to the first and the second time range and the second time range including all instants t satisfying $|t - t_{V0} - \alpha| < T/2$, where $t_{V0}$ is the time at which the alternating voltage of the source cancels out, T is the inverse of the frequency of passages of the derivative of the current through zero, and α is the trigger time value following passage of the alternating source voltage through zero, α being less than the half-period of the alternating source voltage;

the derivative of the current circulating on the power supply line is measured by a Rogowski sensor.

The invention includes a starter system for an electric motor including a switch controlling the motor power supply from an alternating voltage source, characterised in that it comprises hardware and/or software elements for implementation of the method according to the invention. It also relates to a computer program product including program code instructions to determine a switch closing instant using the method according to the invention.

BRIEF DESCRIPTION OF THE DRAWINGS

Other aspects, purposes, advantages and characteristics of the invention will become clear after reading the following detailed description of preferred embodiments of the invention, given as a non-limitative example and with reference to the appended drawings in which.

DETAILED PRESENTATION OF PARTICULAR EMBODIMENTS

Figure 1:
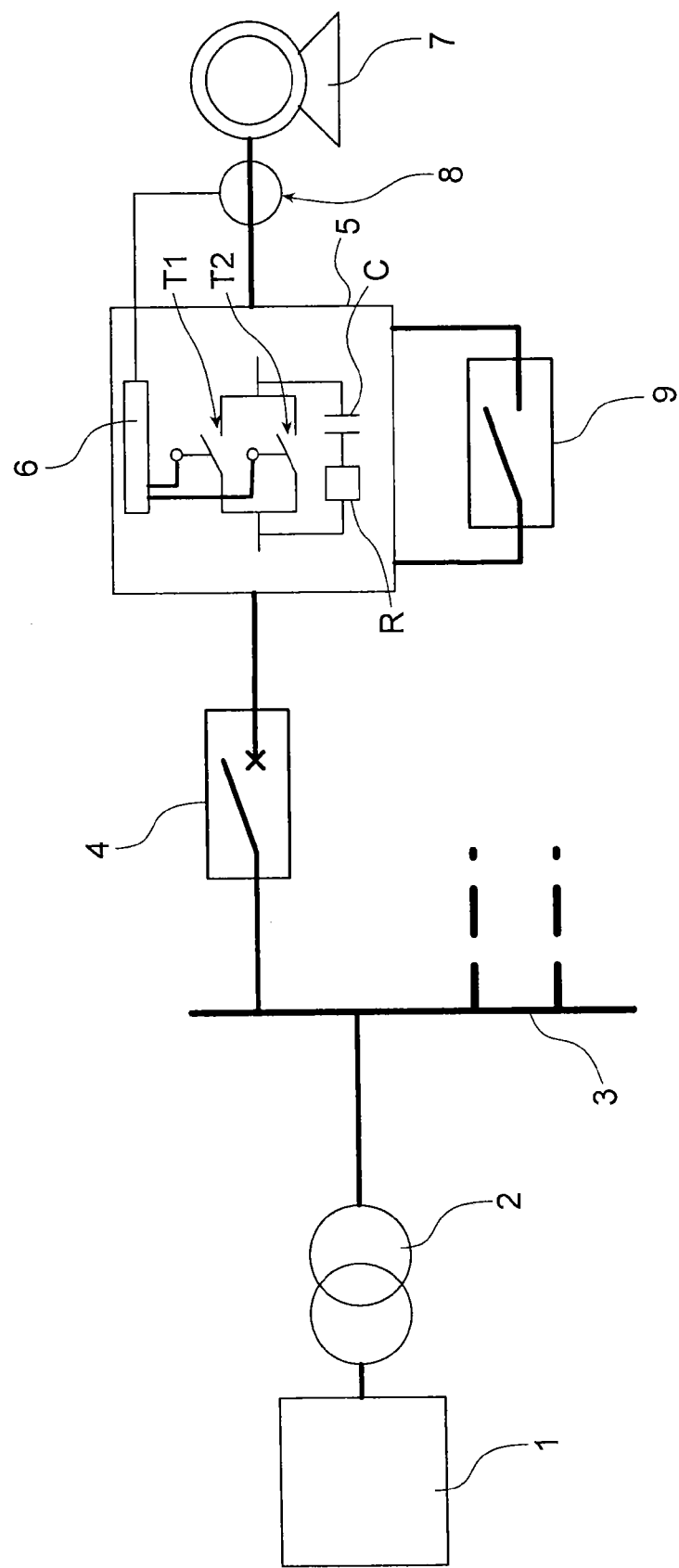
FIG. 1 is a diagram of an installation comprising a control device of an electric motor according to one possible embodiment of the invention.

An embodiment of an installation according to the invention is described below with reference to FIG. 1. The installation includes an electric motor 7 powered by a voltage source 1. The voltage source 1 is connected through a transformer 2 to a bay 3 that supplies power to several cubicles in parallel, of which only one is shown in FIG. 1 and on which there is a contactor or circuit breaker 4 connected to the motor 7 through a motor starter system 5.

A contactor device 9 is arranged in parallel with the starter system 5. It can short circuit the starter system 5 once the motor 7 has reached a sufficient speed.

The motor is of the alternating current type, and particularly of the asynchronous type. It is three-phase. Its nominal voltage is more than 380 V, or even more than 1000 V, or even equal to or more than 5.5 kV.

Therefore the motor is connected to the electrical network and particularly to the voltage source 1 through a motor starter system 5. The motor starter system 5 comprises mainly a controlled switch on each motor power supply line, for example a controlled switch on each of the three power supply phases of a three-phase motor. The controlled switch may be a power transistor. Advantageously, the controlled switch comprises a thyristor, particularly two thyristors T1, T2 mounted in inverse parallel.

The motor starter system 5 also includes a snubber circuit installed in parallel with the controlled switch and composed of a serial circuit composed of a resistance R and a capacitor C.

The motor starter system 5 also comprises a device 6 for controlling the controlled switch. In the case shown, the control device comprises two outputs each input to a trigger-gate of one of the thyristors T1, T2. Thus, the control device 6 can generate a pulse controlling triggering the switch of each of the thyristors T1, T2.

The control device 6 comprises hardware and/or software elements configured, for each alternation of the alternating voltage of the voltage source 1, to determine a closing instant from a measurement of the derivative of the current circulating on a motor power supply line, for example the current passing through the switch or the RC snubber circuit, and to actuate closing of the controlled switch at this determined closing instant. The measurement is made by a measurement sensor of the derivative of the current 8 connected between the control system 6 and the motor 7, more precisely on one of the power supply lines of the three-phase motor. The current derivative measurement sensor 8 is typically a Rogowski sensor.

Figure 2:
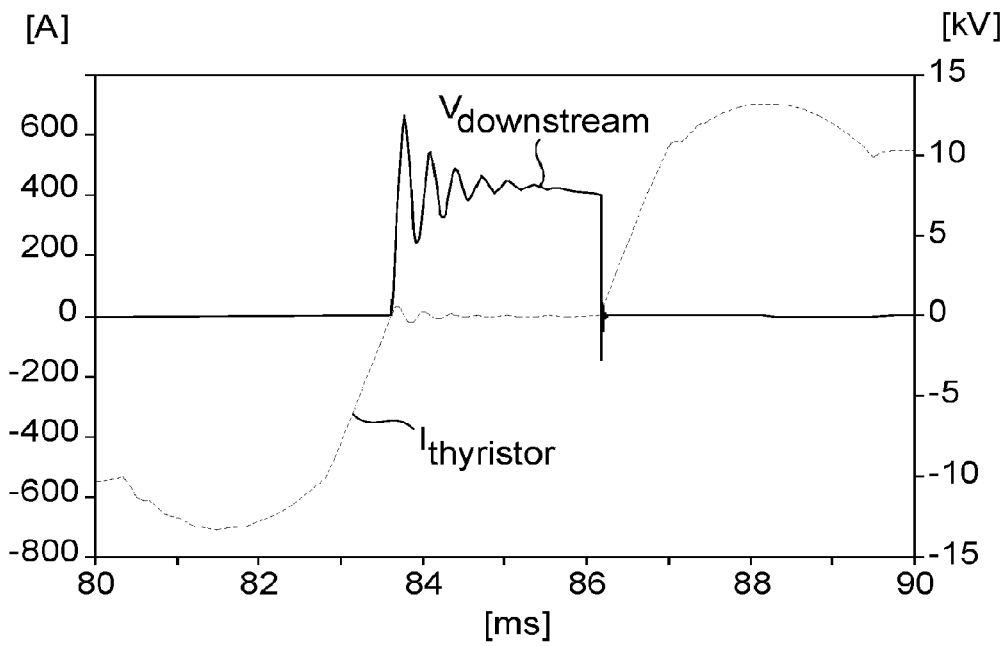
FIG. 2 is a time graph centred on an opening phase of the controlled switch illustrating changes in the current passing through the switch and the electrical potential on the downstream side of the switch.

FIG. 2 shows variations of the current passing through the switch $I_{thyristor}$ (left axis; dashed line) and the electrical potential on the downstream side $V_{downstream}$ of the switch (right axis; continuous line). FIG. 2 is centered on an opening phase of the switch initiated by cancellation of the current $I_{thyristor}$. During the switch opening phase, this potential $V_{downstream}$ has a component at the nominal network frequency that can be treated like a DC component for the duration of the current break, and a transient and oscillating component with a frequency several times higher than the nominal network frequency.

Figure 3:
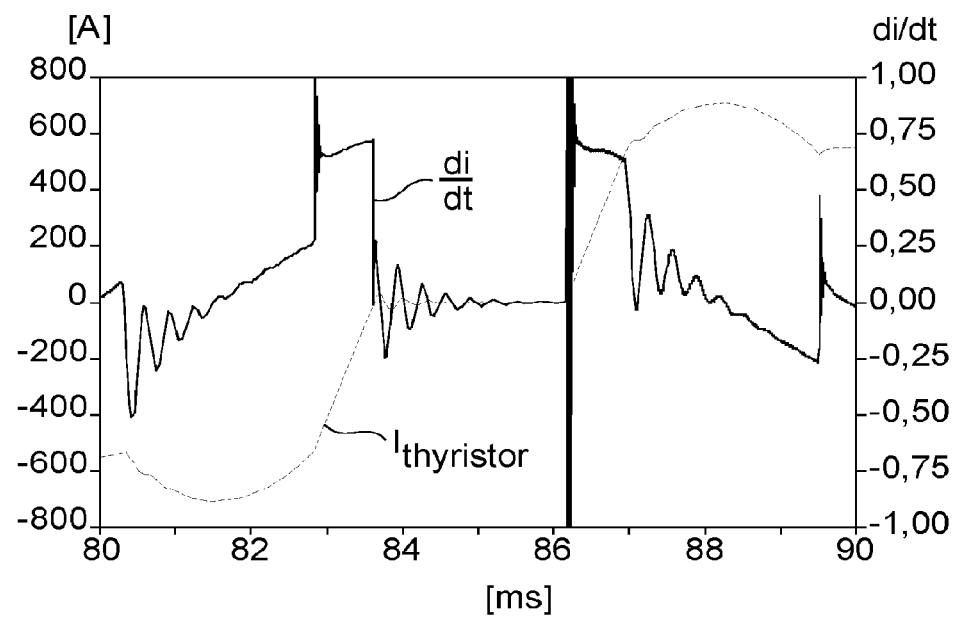
FIG. 3 is a time graph centered on an opening phase of the controlled switch illustrating variations of the current passing through the switch and of the derivative of the current passing through the switch.

FIG. 3 shows the variations of the current passing through the switch $I_{thyristor}$ (left axis; dashed line) and the derivative di/dt of this current (right axis; continuous line), still centered on an opening phase of the controlled switch.

Figure 4:
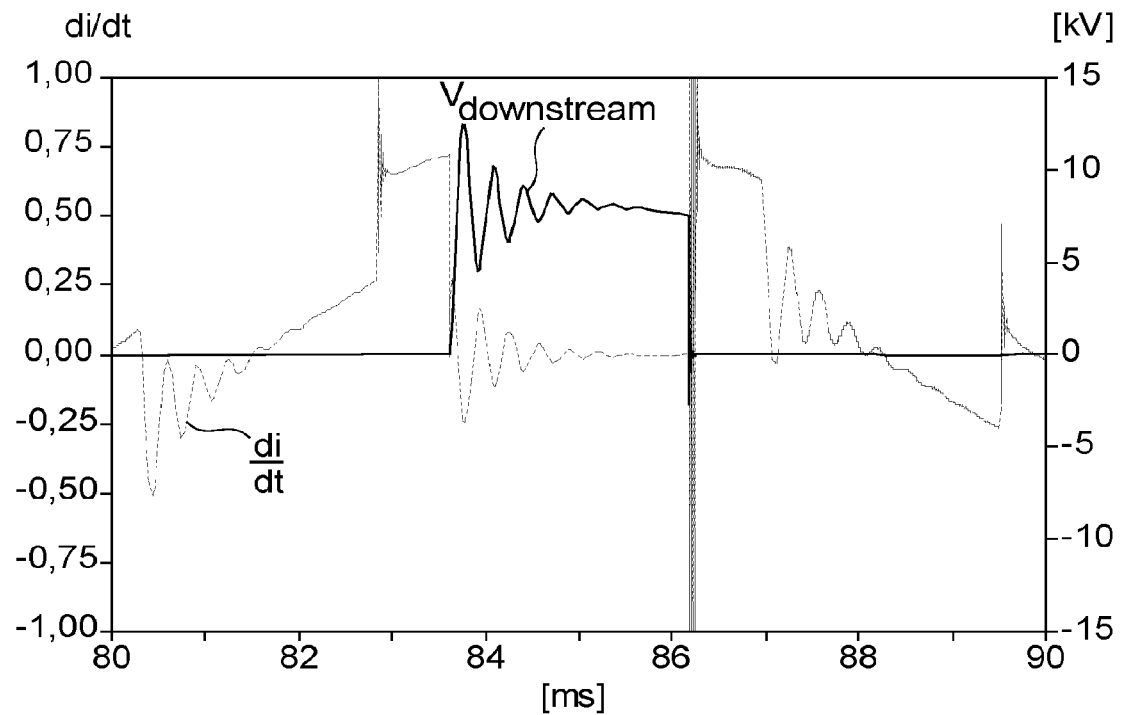
FIG. 4 is a time graph centered on an opening phase of the controlled switch illustrating changes in the electrical potential downstream from the switch and in the derivative of the current passing through the switch.

FIG. 4 is also centered on an opening phase of the switch, and shows variations of the derivative di/dt of the current $I_{thyristor}$ passing through the switch (right axis; dashed line) and the electrical potential $V_{downstream}$ downstream from the switch (left axis; continuous line). These two signals are almost completely in phase opposition (phase offset of 180°). The precise phase offset depends on the frequency of these signals and the parameters of the RC snubber circuit. These two factors can be known sufficiently precisely, the frequency being measured from the duration between two consecutive passages of the derivative of the current through zero as described in detail below. The phase offset is then expressed as $$\Delta = 180° - \varphi_{transient}, \text{ where } \varphi_{transient} = \arctan\left(\frac{1}{w \cdot RC}\right)$$

and where R and C are values of the resistance and the capacitance of the snubber circuit and w is the electrical angular frequency proportional to the oscillation frequency of the transient voltage $V_{downstream}$.

The derivative of the current $I_{thyristor}$ is thus an opposite copy of the transient voltage $V_{downstream}$ on which switching of the controlled switch can be synchronised as disclosed in detail in patent application WO 2013/038094 A2.

The device for measuring the derivative of the current 8, typically a Rogowski sensor, has the advantage of outputting a signal with a negligible delay of less than one microsecond, without being affected by the frequency of the current in the spectrum of transient frequencies encountered in practice (1-5 kHz).

The measurement of the derivative of the current also has the advantage of outputting a signal centered on zero (the component at nominal frequency being very small and negligible in the first oscillation cycles, unlike the transient voltage $V_{downstream}$), and amplifies fast oscillations related to blocking of the thyristor. Since the derivative of the current corresponds to the amplitude of the current multiplied by the electrical angular frequency of the transient, it is a signal that is naturally amplified at high frequency even if its amplitude may be close to zero.

Determination of a blocking time of the switch starting from a measurement of the derivative of the phase current includes the detection of times at which the derivative of the current passes through zero and calculating, by a microprocessor, the frequency of a transient voltage at the terminals of the switch appearing following the passage through zero of the current passing through the switch, in other words after the switch opens, starting from said times of passage through zero. Detection is done by an analoge acquisition system comprising various components including signal amplifiers the role of which is to improve the precision at which times of passage of the derivative through zero are detected, and conventional components for detection of the passage through zero.

For example, the duration separating the first two instants at which the derivative of the current passes through zero after the switch has opened may be calculated, so that the half-period of oscillations of the transient voltage at the terminals of the switch can be deduced. The complete period T and the associated frequency can then be calculated.

Figure 5:
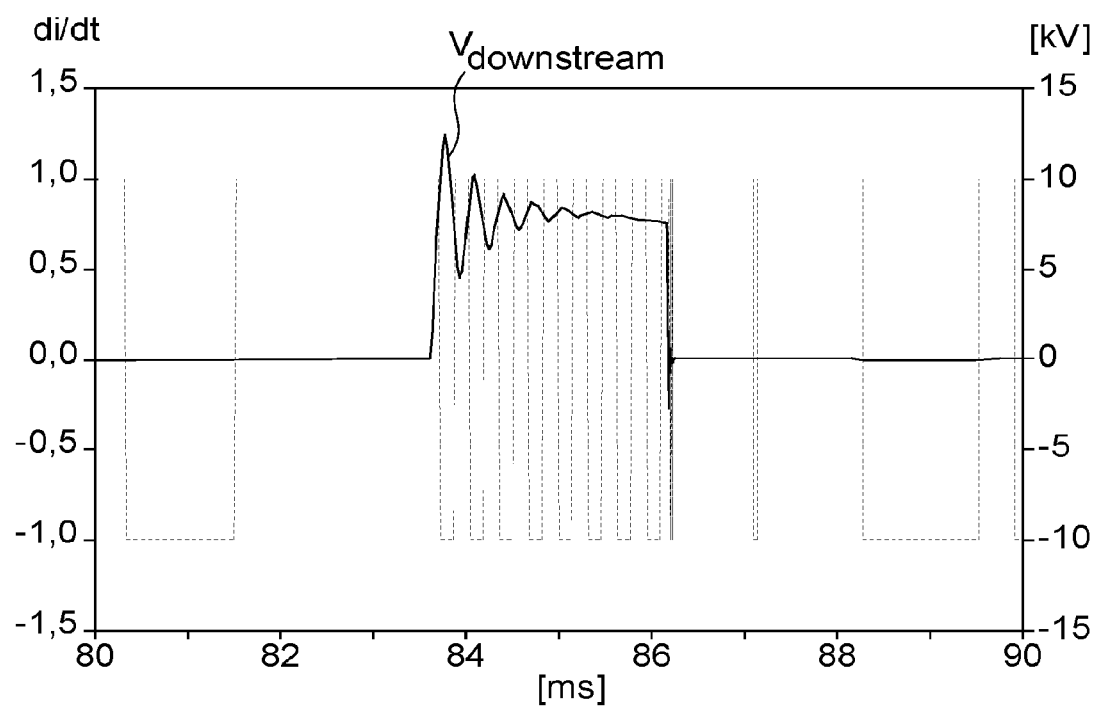
FIG. 5 is a time graph centered on an opening phase of the controlled switch illustrating changes in the electrical potential on the downstream side of the switch and in the rectangular signal with fronts corresponding to the times at which the derivative of the current passing through the switch passes through zero.

This oscillation frequency of the transient voltage thus corresponds to the frequency of a signal made rectangular by the acquisition system, with clipping by said system, for which the fronts coincide with times at which the derivative of the current passes through zero. Thus, FIG. 5, still centered on a switch opening phase, shows variations of such a rectangular signal representative of passages through zero of the derivative di/dt of the current $I_{thyristor}$ passing through the switch (right axis; dashed line) and the electrical potential on the downstream side $V_{downstream}$ of the switch (left axis; continuous line).

The use of a measurement of the derivative of the current also avoids the need to perform complex processing necessary when voltage or current measurements are used. This simplicity results in reduced costs.

The Rogowski sensor does not introduce any significant phase variation in the measured current derivative signal, such that there is no need for a calibration relative to the oscillation frequency of the transient voltage because these signals have the same frequency. On the other hand, correction of times at which the derivative passes through zero may be applied in order to determine times corresponding to negative voltage peaks on which it is required to put thyristors into the closed state according to the formula $$\varphi_{transient} = \arctan\left(\frac{1}{w \cdot RC}\right).$$

The Rogowski sensor can also be used to very precisely control the switch closing (with a maximum deviation of the order of 10 μs), which is useful in some applications, for example to reduce the transient current when the switch is closed.

In one possible embodiment, the control switch 6 is configured, for each alternation of the alternating voltage, so that the determined closing instant of the voltage source corresponds to an opening duration of the switch. In other words, the control device 6 applies a "delta-gamma" control to start the motor, in other words a gamma type control on a signal other than the current, and in fact the "delta" derivative of the current.

Figure 6:
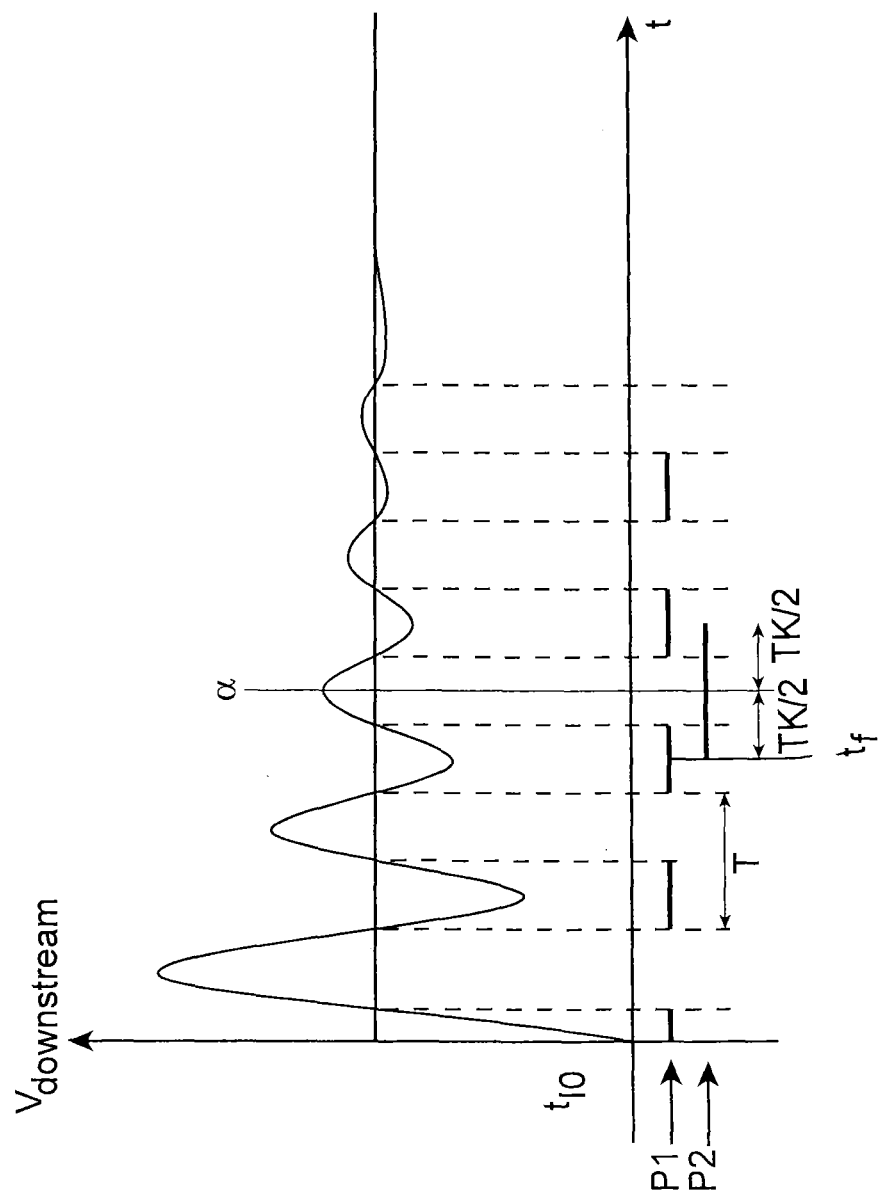
FIG. 6 is a time graph showing the variation of the voltage at the terminals of the controlled switch, after the controlled switch has been switched open.

As disclosed in patent application WO 2013/038094 A2 and as shown in FIG. 6, the determination of closing instant $t_f$ may include, for each alternation of the alternating source voltage, the determination of a first time range P1 starting from the frequency of passages of the derivative of the current through zero, the closing instant belonging to the first time range.

This first time range P1 may be defined as including all times t that satisfy the formula $T \cdot (k-x) < t - t_{f0} < T \cdot (k+y)$, where $t_{f0}$ is the opening instant of the switch, for example detected as the first rising front following a period in which the value of di/dt is fairly constant, T is the period corresponding to the frequency of passages of the derivative of the current through zero, k is a natural integer between 1 and a natural integer n, and x and y are numbers strictly between 0 and 1. The numbers x and y are preferably between 0 and 0.3, preferably between 0 and 0.25 and even more preferably between 0 and 0.2. They are advantageously identical.

This first time range P1 is discontinuous and thus covers instants during which the value of the voltage at the terminals of the controlled switch is minimised. By controlling closing of the switch when this voltage is minimised, the transient current passing through the switch following closure is minimised. For example, with x=y=0.25, the first time range includes the negative alternations of the alternating component of the voltage at the switch terminals.

Also as disclosed in patent application WO 2013/038094 A2, determination of the closing instant may also include determination, for each alternation of the alternating source voltage, of a second time range P2 starting from a start time value α following a passage of the alternating source voltage through zero, the closing instant $t_f$ taking place at the common instant to the first and the second time range.

The second time range may include all instants t satisfying $|t - t_{v0} - \alpha| < T/2$, where $t_{v0}$ is the instant at which the alternating source voltage cancels out, T is the period corresponding to the frequency of passages of the derivative of the current through zero, and α is the trigger time value following a passage of the source alternating voltage through zero, where α is less than the half-period of the alternating source voltage.

The trigger time value α translates the duration between the time $t_{v0}$ at which the alternating source voltage cancels out and the closing instant $t_f$, into alpha control mode. This value α is defined as a function of different parameters, and particularly the required mechanical torque at start up, resulting in an rms voltage to be reached at its terminals. In the start phase, the controlled switch opening instant reduces as the speed increases. The result is that the rms value of the electrical voltage applied to the motor increases progressively.

In the framework of control according to the invention, the controlled switch is switched to close at the first time $t_f$ common to the first and second time ranges as shown in FIG.

6. Therefore, there is a slight offset relative to the value α, but this offset is small relative to the voltage oscillation frequency. Therefore the influence of this offset on the rms value of the voltage applied to the motor is quite negligible, or it does not introduce any disadvantages on global operation of the progressive starter.

The method as described above is repeated on each alternation of the alternating voltage of the voltage source. Thus, two time ranges are defined for each alternation of the alternating source voltage. And when a controlled switch comprising a first thyristor and a second thyristor is used, the first thyristor is used during positive alternations and the second thyristor is used during negative alternations.

The invention is not limited to the control method and a starter system as described above, but also includes a computer program product including program code instructions to determine a switch closing instant according to the control method.

The invention claimed is:

1. A method for controlling a switch that controls an electric motor power supply from an alternating voltage source through a power supply line, comprising:
    measuring the derivative of the current carried on the power supply line; and
    determining a switch closing instant from the measured derivative of the current carried on the power supply line,
    wherein determining the switch closing instant includes detecting the instants at which the derivative of the current passes through zero and calculating, from said instants, the frequency of a transient voltage appearing at the terminals of the switch following a passage through zero of the current passing through the switch when the switch is opened.

2. The method according to claim 1, in which the frequency of the transient voltage corresponds to the frequency of a rectangular signal with fronts that coincide with the instants at which the derivative of the current passes through zero.

3. The method according to claim 1, in which the determining the switch closing instant consists of determining a switch opening duration.

4. The method according to claim 3, in which the switch closing instant is determined by determining a first time range starting from the frequency of passages of the derivative of the current through zero, the switch closing instant being included in the first time range.

5. The method according to claim 4, in which the first time range is defined as including all instants t satisfying the formula $T \cdot (k-x) < t - t_{f0} < T \cdot (k+y)$, where $t_{f0}$ is the switch opening instant, T is the period corresponding to the frequency at which the derivative of the current passes through zero, k is a natural integer between 1 and a natural integer n, and x and y are numbers strictly between 0 and 1.

6. The method according to claim 5, in which x and y are between 0 and 0.3, preferably between 0 and 0.25, and even more preferably between 0 and 0.2.

7. The method according to claim 5, in which x and y are between 0 and 0.25.

8. The method according to claim 5, in which x and y are between 0 and 0.2.

9. The method according to claim 4, in which the determining the switch closing instant includes determining a second time range starting from a trigger time value subsequent to the passage of the alternating source voltage through zero, the switch closing instant ($t_f$) occurring at the instant common to the first and the second time range.

10. The method according to claim 9, in which the second time range includes all instants t satisfying $|t - t_{v0} - \alpha| < T/2$, where $t_{v0}$ is the time at which the alternating voltage of the source cancels out, T is the inverse of the frequency of passages of the derivative of the current through zero, and a is the trigger time value following passage of the alternating source voltage through zero, a being less than the half-period of the alternating source voltage.

11. The method according to claim 1, in which the derivative of the current circulating on the power supply line is measured by a Rogowski sensor.

12. A starter system for an electric motor, including a switch controlling the motor power supply from an alternating voltage source, comprising hardware and/or software elements for implementation of the method according to claim 1.

13. A computer program product including program code instructions to determine a switch closing instant using the method according to claim 1.

* * * * *